United States Patent

Maher

[11] 4,154,225
[45] May 15, 1979

[54] DE-ICING UNIT

[76] Inventor: Pat Maher, c/o Goldie Kregger, 65 Grove Ave., Salt Lake City, Utah 84115

[21] Appl. No.: 823,625

[22] Filed: Aug. 11, 1977

[51] Int. Cl.² .............................................. F24H 1/28
[52] U.S. Cl. .................................. 126/350 R; 126/351; 126/362; 122/161
[58] Field of Search ...................... 122/161; 248/215; 126/380, 350 R, 351, 357, 362, 390

[56] References Cited

U.S. PATENT DOCUMENTS

| 2,303,382 | 12/1942 | Newhouse | 126/351 |
| 2,832,320 | 4/1958 | Thome et al. | 122/161 |
| 3,424,422 | 1/1969 | Klangos | 248/215 |
| 3,703,167 | 11/1972 | Maher | 126/351 |

FOREIGN PATENT DOCUMENTS 426494  4/1935  United Kingdom ..................... 122/161

Primary Examiner—John J. Camby
Assistant Examiner—Larry I. Schwartz
Attorney, Agent, or Firm—B. Deon Criddle

[57] ABSTRACT

An easily mounted, efficient de-icing unit for stock watering tanks and the like. A heating unit is suspended exteriorly of a tank and acts on a constantly replenished, required volume of wafter from the tank to heat it and to build up a steam and hot water pressure that is discharged through orifices in a float supported tube that extends around the periphery of the tank.

14 Claims, 2 Drawing Figures

DE-ICING UNIT

BRIEF DESCRIPTION OF THE INVENTION

This invention relates to devices for keeping water surfaces and the like, free from ice and particularly to devices that are intended to be left unattended for long periods of time and that are intended to keep ice from forming on stock watering troughs and tanks. The value of heating watering tanks for stock and the like has long been recognized. It has frequently been found necessary to heat the water to remove ice or to keep the ice from forming, so the animals can drink, or to use personnel or machines to break up ice formations. If the animals drink cold water they must use up a great deal of energy in warming the water in their bodies. If the water is warm when they drink this energy can be conserved, and over a year's period of time this energy-savings will result in beef animals that have been drinking warmed water being worth considerably more than those that have been forced to drink icy water throughout a winter season.

PRIOR ART

In the past, a number of water tank heating devices have been proposed. Generally, these are immersion type heaters that are partially or fully submerged into the water in a tank and that generate heat at a burner and that radiates it only to the immediate vicinity of the heater. Since the ice forms on the water at the outer edges first and then freezes towards the center, these immersion heaters have, at best, been able to keep only a very small water area surrounding them free from ice. Of course, a number of the immersion heaters can be spaced around a tank in the outer edge of the water and these may effectively prevent freezing of the water in the tank. However, such an arrangement is expensive, both because of the cost of the heaters themselves and because of the amount of fuel they consume. In addition, this arrangement is quite inefficient since a great deal of sub-surface water is heated unnecessarily and can be dangerous should any of the fuel used inadvertantly escape into an animal watering tank. In my U.S. Pat. No. 3,703,167, there is shown a heating device that sits outside a watering tank or the like and that heats a small amount of water from the tank to form steam that is injected to the water in the tank around the edge thereof to keep ice off the water in the tank.

SUMMARY OF THE INVENTION

Principal objects of the present invention are to provide an improved de-icing unit that heats only a minimum amount of water and that then uses the heated water and generated steam to efficiently warm the zone where freezing begins, so that ice crystals will not form in that zone.

Another object is to provide a de-icing unit that will, when used with an animal watering tank, efficiently keep the zone from which the animals drink free from ice and the water in that zone warmed, whereby the animals drink warmed water.

Still another object is to provide such a de-icing unit that can be conveniently mounted to tanks of different sizes and capacities and that will be efficient in the use of heating fuel.

Principal features of the invention include a suspension and support means by which the de-icing unit of the invention is suspended from the rim of the water tank containing water to be kept free of ice; and a housing containing a plurality of chambers in which increasing volumes of water are progressively warmed. The chambers, include a domed core in which a small quantity of water is initially generated into steam, a larger reservoir above the core to provide a secondary steam generating chamber and a surrounding jacket that may also provide a source of steam, if necessary to maintain the watering tank sufficiently ice free, and at a desired temperature, as sensed by a thermostat placed in the tank. Hot water and steam generated in the chambers is discharged through orifices in a ring carried by floats in the water to be kept free of ice.

A pilot burner is provided to maintain a burner assembly in a ready state to be fully operable in heating the water in the chambers, upon demand, as indicated by the thermostat.

Additional objects and features will become apparent from the following detailed description and drawings, disclosing what is presently contemplated as being the best mode of the invention.

THE DRAWINGS

In the drawings:

FIG. 1 is a perspective view of a stock watering tank, with the de-icer unit of the invention and its fuel supply attached thereto;

FIG. 2, an enlarged vertical section taken on the line 2—2 of FIG. 1 and showing the stock watering tank only fragmentarily.

DETAILED DESCRIPTION

Figure 1:
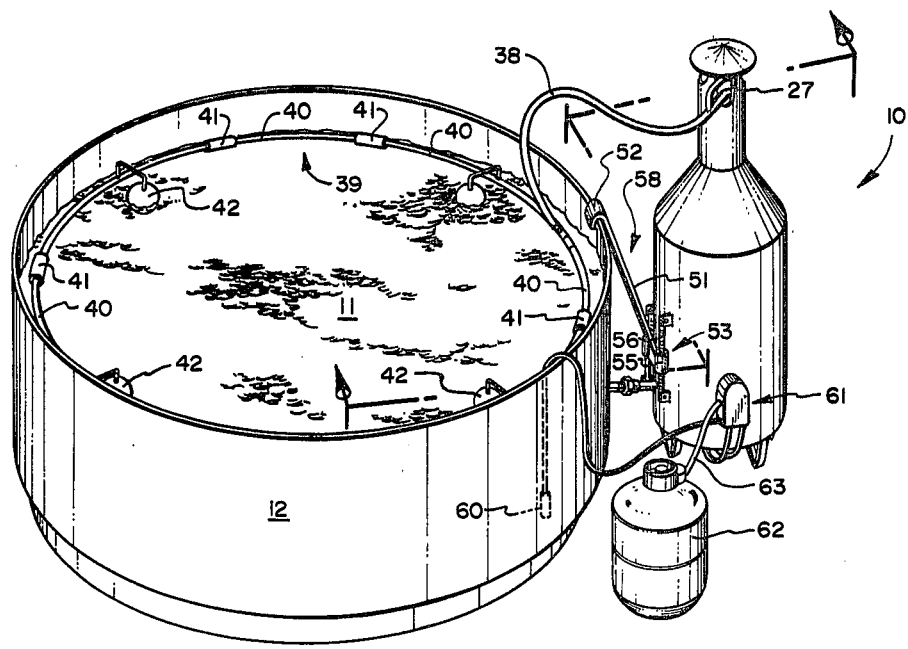
Figure 2:
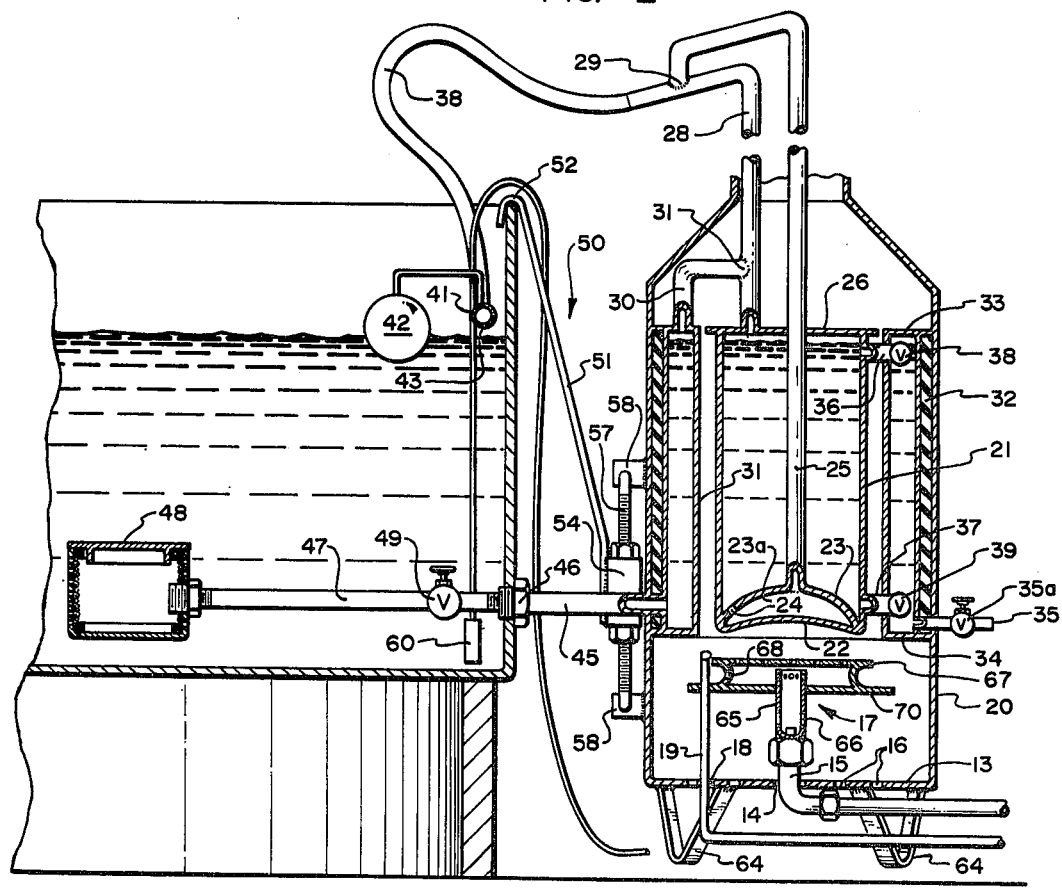

Referring now to the drawings:

In the illustrated preferred embodiment, the improved de-icer unit of the invention is shown generally at 10 and is arranged to keep the water 11 of a stock watering tank 12, or the like in a substantially ice-free condition.

The improved de-icer unit includes a base plate 13 with a central opening 14 through which a main gas inlet pipe 15 is inserted and with openings 16 therethrough to admit air to a burner 17 mounted on the gas inlet pipe 15. Another opening 18 through the base plate 13 has a pilot tube 19 inserted therethrough to a location just above the uppermost surface of the burner 17.

Burner 17 is positioned within a heater housing 20 that extends upwardly from the base plate 13 and below a central receptacle 21 that is suspended within housing 20. The receptacle 21 has a concave bottom 22 that is spaced above the top of burner 17 and a concave inner top dome 23 therein, forming with the bottom 22 a core 23a that is spaced above the bottom 22. Holes 24 through the dome 23 allow passage of water from inside receptacle 21 to the core 23a. A steam outlet pipe 25, opens through the top of dome 23 and extends upwardly from core 23a through the top 26 of receptacle 21 and out an opening 27 formed in the vent stack at the top of housing 20.

Another pipe 28 extends through the top 26 of receptacle 21 and is connected into pipe 25 at connection 29. Still another pipe 30 extends upwardly from a water jacket 31 that is spaced from and that surrounds the receptacle 21, and the pipe 30 is connected into the pipe 28 at connection 31.

A layer of insulation material 32 is provided between water jacket 31 and housing 20 and between top and bottom plates 33 and 34 of the water jacket. The top and bottom plates are welded or otherwise affixed to the housing 32 to hold the water jacket in place.

A drain pipe 35 extends from within water jacket 31, at the bottom thereof, through the insulation material 32 and through the housing 20 to provide means whereby water can be drained from the water jacket, and a manually operated control valve 35a is provided in the pipe 35, outside of the housing, to control flow therethrough.

The interior of receptacle 21 is connected to the interior of water jacket 31 by tubes 36 and 37 at the tops and bottoms thereof, respectively. The tubes 36 and 37 have check valves 38 and 39, respectively therein and the check valve 38 permits flow from the water jacket to the receptacle, while preventing reverse flow and the check valve 39 permits flow from the receptacle to the water jacket, while preventing reverse flow through the tube 37.

Pipe 25 is connected, at its upper end, to one end of a flexible hose 38 and the other end of the hose is connected to a generally ring-shaped tube, shown generally at 39.

Tube 39 is made up of somewhat flexible arcuate sections 40 (made of copper or the like) interconnected by sleeve couplings 41. A plurality of floats 42 are spaced around the ring formed by the interconnected arcuate sections, and each float has a generally U-shaped arm, with one short end of the arm attached to the float and the other longer end of the arm attached to an arcuate section 40. The floats and U-shaped arm sizes, and the number of floats used, are selected such that the arcuate sections will be held slightly above the surface of water 11 in tank 12 when the floats are resting on the water. If desired, the U-shaped arms can be bent, or adjustment means (not shown) can be provided, to change the relative height of tube 39 above the water surface. Spaced orifices 43 in the bottoms of the couplings 41 allow water and steam accumulating in the tube 39 to escape, as will be hereinafter further disclosed. During such use, one arcuate section is coupled to hose 38 and additional arcuate sections are coupled together and to the one section to form the ring-shaped tube 39 that fits closely within the wall of the watering tank 12.

An inlet pipe 45 extends through the housing 20 and the insulation 32 into the lower portion of water jacket 31.

Inlet pipe 45 is connected into a fitting 46 that opens through the wall of watering tank 12, near the bottom thereof, and a pipe 47 has one end connected to the fitting 46 inside the tank. The other end of pipe 47 has a filter 48 thereon through which water in the tank is passed before entering pipe 47 and the water jacket 31. A valve 49 in the pipe 47 is positioned within the tank to be manually operated by a long key inserted from the top of the tank 12, to thereby regulate flow through pipe 47.

The de-icer unit 10 is preferably suspended from the tank 12 such that the tops of the water jacket 31 and receptacle are approximately aligned with the level of the water 11 in the watering tank 12, as controlled by a float valve or the like, not shown, on the inlet control, not shown, to the tank. The fitting 46 is inserted through the sidewall of the tank to be in alignment with the pipe 45 and the elevation of the tank heater is adjusted to place the pipe 45 and fitting 46 as near to a location immediately above the bottom of tank 12 as possible, by use of the adjustment means shown generally at 50.

Adjustment means 50, includes a hanger bar 51 that extends upwardly and outwardly from the de-icer unit and that has a hook 52 formed on one end to engage the upper edge of the wall of tank 12. The other end of hanger bar 51 is centrally connected to a bracket 53, the ends of which comprise sleeves 54 and 55 that respectively reciprocate on threaded, spaced apart, parallel shafts 56 and 57. Nuts above and below the sleeves are threaded up and down the shafts to move the sleeves.

The shafts 56 and 57 extend vertically with respect to the housing 20 and are spaced from the housing by lugs 58 that are welded or otherwise affixed to the housing 20.

A thermostat 60 is suspended in the tank 12 and controls operation of a valve assembly 61, mounted on the outside of housing 20. The gas lines 14 and 19 extend from the valve assembly and gas (butane or the like) is supplied to the valve assembly from a storage tank, such as the standard portable pressure regulated cylinder 62 shown, through a line 63.

Legs 64, of strap material, are attached to the lowermost end of housing 20 to limit downward movement of the de-icer unit such that lines 14 and 19 cannot be placed in mud, etc. surrounding the water tank, and so that air can be admitted to the burner from beneath plate 13.

In operation, the de-icer unit 10 is positioned with respect to the tank by hanging it from the rim of the tank. An adjusting it vertically, as has been explained. The arcuate tube sections 40 are interconnected and placed around the inner wall of tank 11 and are connected to flexible hose 38, as previously described.

The thermostat 60 is placed in the tank and the gas cylinder 62 is placed close enough to the de-icer unit that the flame thereof will warm the tank to keep the fuel thereof (i.e. propane) from jelling during extremely cold temperatures. The cylinder is also connected to the control valve 61. The gas exiting from the pilot line 19 is ignited and the unit is in an operating condition. The control valve 61 is operated in conventional fashion by the thermostat 60 and when a predetermined temperature (just above the freezing temperature of the water in the tank is reached) the control valve is opened to allow flow through the main line 14 to the burner 17. A Robertshaw Stock Tank Control Hydraulic Snap Action Valve with thermostat has been found to be suitable for use with the invention, for example. The valve is then set to be turned on at about 32° F. and to be closed about 40° F., as sensed by the thermostat in the tank.

The burner 17 includes a tubular nozzle 65, with ports 66 through the side thereof through which air is entrained by the discharging gas stream and a spreader plate 67 above the nozzle. The spreader plate is perforated to allow gas therethrough and the gas moving through the spreader plate is ignited by the pilot flame at the end of the pilot tube. Additional openings 68, spaced around the sidewall support 69 between the spreader plate and a support plate 70 carried by the burner nozzle allows additional air to be mixed with the gas to be burned.

The heat generated by the burner 17 is largely collected beneath the concave bottom 22 and effectively heats the water thereabove in the core 23a. The hot water and steam generated in the core are discharged up pipe 25, through flexible hose 38, and are discharged through the orifices 43 in the bottom of the couplings of tube 39 into the tank. The steam and hot water so discharge warm the water in the tank and effectively keep ice from forming, particularly around the edge of the tank, which is the area from which stock will normally drink.

Continued full operation of the burner will result in heating of the water in receptacle 21. Such heating results from conduction through the wall of the receptacle from the concave bottom 22, and from hot exhaust gases travelling upwardly between receptacle 21 and water jacket 31. When the water in receptacle 21 is sufficiently heated more steam and hot water are generated to be discharged upwardly through pipe 28 and the flexible hose 38 to the tank. If the thermostat continues operation of the valve to allow flow through the main line 14 to continue, the water in the water jacket 31 will eventually be sufficiently heated by the burner 17 and the exhaust gases discharging therealong, and even more steam and hot water will be generated to be discharged through pipe 30 and the flexible line 38 to the tank.

With the present structure, the burner is used to generate only the amount of steam and hot water necessary to keep the water 11 in the tank 12 within the predetermined temperature range for which thermostat 60 is set, i.e. between 32° and 40° F. If the ambient temperature is only slightly below the freezing of the water or remains there for only short periods of time, a relatively small amount of steam and hot water may be adequate and the burner will cut-off (except for the pilot flame) after steam and hot water have been generated and discharged through pipe 25. If more steam is required to provide increased warming the burner will continue operation until steam and hot water are discharged through one or both of the pipes 28 and 30. In any event, the burner will be fully operated only to the extent necessary to maintain the desired temperature and there will not be a wasting of fuel in the heating of large volumes of water to provide the necessary steam.

The water in the tank heater comes from tank 12 through filter 48, valve 49, and pipes 47 and 45. It enters the water jacket 31, filling the jacket before it will move through tube 46 into receptacle 21. As the receptacle 31 is filled the water therein passes through hole 24 to fill the core 23a.

When it is desired to drain the tank heater valve 35a is opened to allow water to flow out pipe 35. The water from core 23a and receptacle 21 then flows through tube 32 into the water jacket and from there out the pipe 35.

The present invention has proven effective not only in maintaining a reservoir in an ice free condition, and in providing warmed water for livestock to drink, but also in reducing the incidence of disease amoung such livestock. It has been found that where the water is drawn into the heating unit from the bottom of the reservoir and steam is supplied at the top of the reservoir, a water circulation pattern will develop such that the water is heated to steam and is subjected to oxygenation as the steam is sprayed into the reservoir.

The heating and/or oxygenation destroys many organisms present in the water, many of which organisms are present because one such animal, during drinking, has contaminated the water. Once the water has been contaminated, other drinking animals may then become contaminated, unless the water is treated in some manner to destroy the harmful organisms. With the present invention treatment of the water is accomplished automatically as the water is maintained in its ice-free condition.

While a preferred embodiment of my invention has been herein disclosed, it is to be understood that such disclosure is by way of example and that variations are possible without departing from the subject matter coming within the scope of the following claims, which subject matter I regard as my invention.

I claim:

1. A de-icer comprising
a housing;
a receptacle in said housing;
an enclosed core inside and at the bottom of the receptacle, with a bottom surface of said receptacle serving as a bottom surface of said core;
port means through an upper wall of said core to interconnect the interior of said core and the interior of said receptacle;
burner means arranged to heat said bottom surface;
a water jacket spaced from said receptacle, with the space between said water jacket and said receptacle providing means whereby combustion gases from said burner means pass between said water jacket and said receptacle;
means for supplying water to the water jacket, the receptacle and the core;
exhaust means from the top of each of said water jacket, receptacle and core; and
means coupled to the exhaust means for discharging hot water and steam therethrough to a watering tank or the like.

2. A de-icer as in claim 1, further including
spaced leg means projecting downwardly from the housing below the burner means, whereby said leg means will support said housing to allow air to pass therebeneath to the burner means.

3. A de-icer as in claim 1, further including
means for suspending the tank heater from the upper edge of a watering tank.

4. A de-icer as in claim 2, wherein the means for suspending the tank heater from the upper edge of a water tank includes
adjustment means, whereby the position of the heater can be vertically adjusted relative to the tank.

5. A de-icer unit as in claim 1, further including
a source of pressurized fuel for the burner;
valve means controlling flow from the source of pressurized fuel to the burner;
a thermostat controlling operation of the valve means and adapted to be positioned in the watering tank, whereby said valve is opened to allow full flow of fuel therethrough to the burner when water in the watering tank is just above freezing and to continue said open condition of said valve until the water in the watering tank has reached a predetermined temperature above the freezing temperature of said water.

6. A de-icer unit as in claim 5, wherein
the compartments comprise a water jacket, a receptacle spaced from and inside the water jacket and a core inside and at the bottom of the receptacle.

7. A de-icer as in claim 6, wherein
the burner is positioned beneath the core.

8. A de-icer unit as in claim 7, wherein
the water jacket and receptacle provide an exhaust passage from the burner.

9. A de-icer as in claim 8, further including means to supply water to each said compartment from the tank.

10. A de-icer as in claim 9, further including means for suspending the tank heater from the upper edge of a watering tank.

11. A de-icer as in claim 10, wherein the means for suspending the tank heater from the upper edge of a water tank includes
adjustment means, whereby the position of the heater can be vertically adjusted relative to the tank.

12. A de-icer unit as in claim 11, further including spaced leg means projecting downwardly from the housing below the burner means, whereby said leg means will support said housing to allow air to pass therebeneath to the burner means.

13. A de-icer comprising
a housing;
a plurality of compartments in said housing, said compartments comprising a water jacket, a receptacle spaced from and inside the water jacket, and a core inside and at the bottom of the receptacle;
burner means beneath the core and arranged to sequentially heat the water in said compartments to generate steam and hot water therein, the space between said water jacket and receptacle providing an exhaust passage from the burner;
means for supplying water to each of said compartments;
means for collecting the steam and hot water generated in said compartments and for discharging said steam and hot water into a watering tank and the like;
spaced leg means projecting downwardly from the housing below the burner means, whereby said leg means will support said housing to allow air to pass therebeneath to the burner means; and
means for suspending the tank heater from the upper edge of a watering tank or the like, said means including adjustment means comprising a hangar bar including a hook on one end thereof to fit over the upper edge of a watering tank and sleeve means on the other end thereof, at least one threaded shaft fixed to the housing, and nut means threaded on the threaded shaft to move the sleeve means with respect to the threaded shaft, whereby the position of the heater can be vertically adjusted relative to the tank.

14. A de-icer comprising
a housing;
a plurality of compartments in said housing;
means for supplying water to each of said compartments;
burner means arranged to sequentially heat the water in said compartments to generate steam and hot water therein;
means for collecting the steam and hot water generated in said compartments and for discharging steam and hot water into a watering tank or the like; and
means for suspending the tank heater from the upper edge of a watering tank or the like, said means including adjustment means comprising a hangar bar with a hook an one end thereof to fit over the upper edge of the tank and sleeve means on the other end thereof, at least one threaded shaft fixed to the housing and nut means threaded on the threaded shaft to move the sleeve means with respect to the threaded shaft, whereby the position of the heater can be vertically adjusted relative to the tank.

* * * * *